Figure 2:
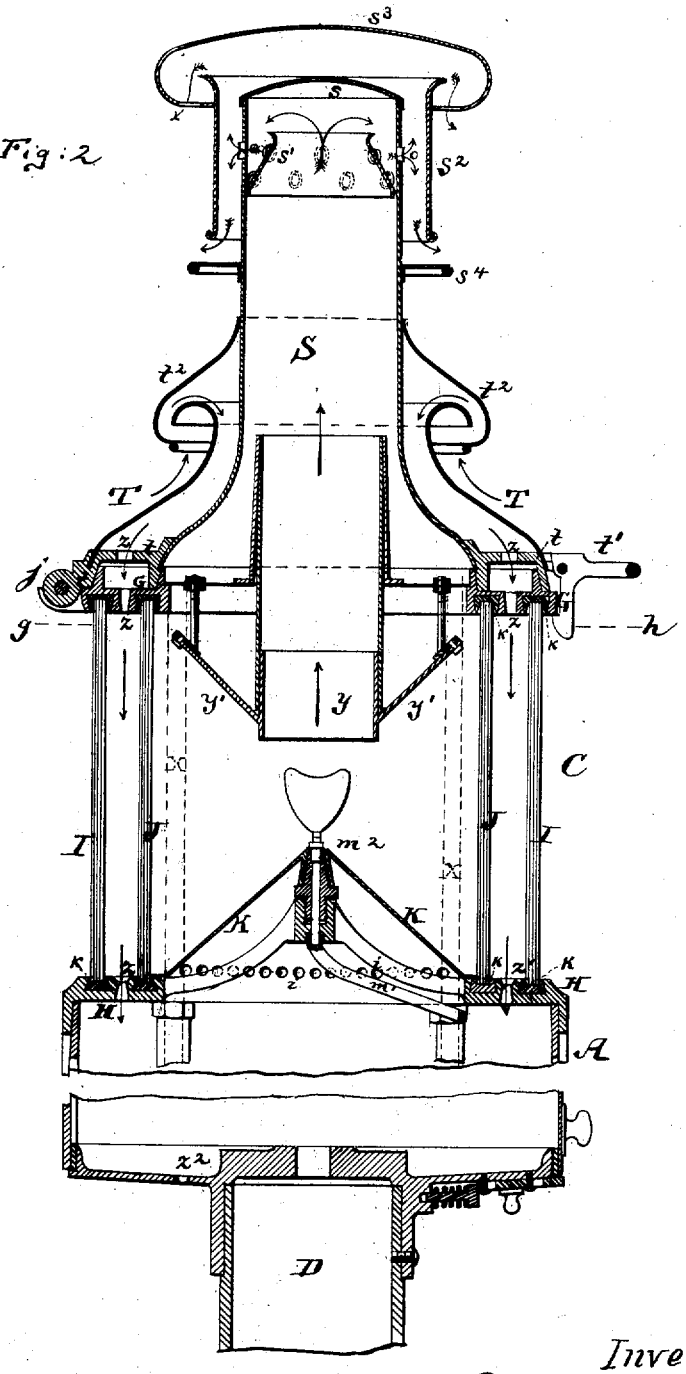

R. PINTSCH.
Floating Signal Light.
No. 9,665. Reissued April 12, 1881.
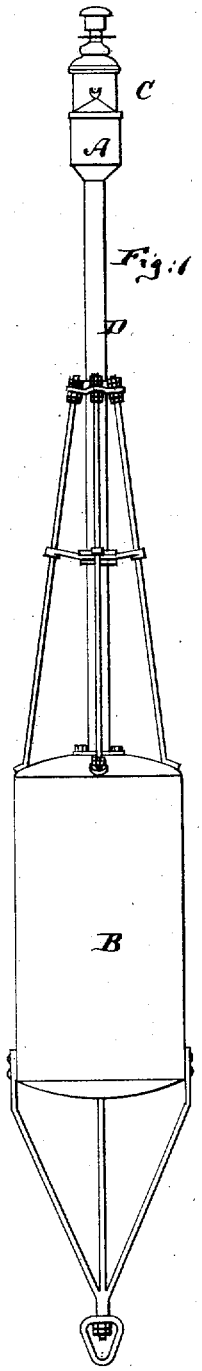
Fig: 3
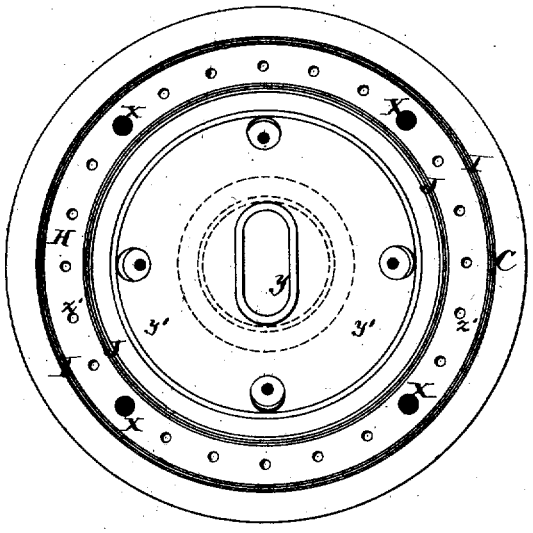
Witnesses:
John C. Tumbridge.
Willy H. L. Schmidt.
Inventor:
Richard Pintsch
by his attorney
A. v. Briesen

R. PINTSCH.

Floating Signal Light.

No. 9,665. Reissued April 12, 1881.

Witnesses:
John C. Fitzpatrick
Willy A. G. Schmitz

Inventor:
Richard Pintsch
by his attorney
A. Briesen

UNITED STATES PATENT OFFICE.

RICHARD PINTSCH, OF BERLIN, GERMANY.

FLOATING SIGNAL-LIGHT.

Specification forming part of Reissued Letters Patent No. 9,665, dated April 12, 1881.

Original No. 190,979, dated May 22, 1877. Application for reissue filed August 25, 1880.

DIVISION B.

*To all whom it may concern:*

Be it known that I, RICHARD PINTSCH, of Berlin, Prussia, Germany, have invented an Improvement in Lanterns, of which the following is a full and exact description.

This invention relates to a new lantern, which is to be used more particularly on buoys or floating lights, but which is also useful in other places, the lantern being constructed so as to insure a proper supply of air to the flame and exclude water, that may be dashed against it, from the burner.

In the accompanying drawings, Figure 1 represents an elevation of the buoy and lantern. Fig. 2 is a central vertical section of the lantern; Fig. 3, a horizontal section on line *g h*, Fig. 2.

As shown in the drawings, the lantern C is secured upon a pipe, D, that projects upwardly from a buoy, B, which buoy is a recipient for compressed illuminating-gas. The manner in which said recipient is made chargeable with the compressed gas and the arrangement for supplying the gas from the recipient B to the burner $m^2$ of the lantern through the pipe $m'$, does not constitute part of the invention here to be described, as it is fully referred to in another division of reissue of the Letters Patent of which this is one division.

The lantern consists of two concentric glass cylinders, I J, fitting with their upper and lower ends air-tight against caoutchouc packing *k k* in undercut grooves formed in metal rings G H, of which H is fixed to a lower casing, A, while G is tied down to H by means of tie-bolts X. The top of the lantern is closed by a cover, T, hinged to the ring G at *j*, and fitting with beveled rims *t* in an air-tight manner against corresponding rims on G, and secured by a catch, $t'$. The cover has—first, a chimney, S, into which the products of combustion from the burner are led around the reflector $y'$, and also through the chimney *y*, which is, by preference, of oval transverse section, as shown at Fig. 3, and is supported by the upper reflector, $y'$. The chimney S is closed by a cap, *s*, at top, the gases being made to escape through the conical piece $s'$ and holes *o*, protected by the wind-guard $s^2$ $s^3$, and also by a projecting-rim, $s^3$, against the action of the wind, and also against the ingress of water-spray. The air for supporting combustion enters beneath the wind-guard $t^2$, and, passing through holes *z* into the annular space between the two glass cylinders I J, descends therein and issues through holes $z'$ in the ring H into the space below the reflector K, whence it passes, through a number of small holes, *i*, in the reflector, into the interior of the lantern. Any water-spray that may possibly find its way through the wind-guard will flow off through the holes *z z'* and through other holes $z^2$ in the bottom of the casing A without interfering with the action of the lamp.

I claim—

1. In a lantern, the combination of the two rings G and H, the concentric cylinders I J, which surround the burner, with the cover having the wind-guard $t^2$ and perforated reflector K, substantially as and for the purpose specified.

2. In a lantern, the concentric glass cylinders I J, secured, with caoutchouc packing *k*, in rings G H, having holes *z* and $z'$, in combination with the hinged cover T and chimney S, arranged and operating substantially as herein described.

3. In a lantern, the combination of the glass cylinders I J, with the rings G H, which are perforated in line with the space between said cylinders, and with the casing A, having lower drip-discharge opening $z^2$, substantially as specified.

4. In a lantern, the combination of the chimney S, and its conical piece $s'$ and cap *s*, with the wind-guard and the burner and its chimney, substantially as for the purpose herein shown and described.

5. In a lantern, the upper reflector, $y'$, carrying the chimney *y*, in combination with the outer chimney, S, of larger diameter, all arranged so that the products of combustion can reach the chimney S through the chimney *y* and around the reflector $y'$, substantially as herein shown and described.

RICHARD PINTSCH.

Witnesses:

BERTHOLD ROI,

BANCROFT C. DAVIS.